United States Patent
Knierim et al.

(10) Patent No.: US 12,442,838 B2
(45) Date of Patent: Oct. 14, 2025

(54) CURRENT MONITOR COMBINING A SHUNT RESISTOR WITH A ROGOWSKI COIL

(71) Applicant: Tektronix, Inc., Beaverton, OR (US)

(72) Inventors: Daniel G. Knierim, Beaverton, OR (US); David L. Knierim, Wilsonville, OR (US)

(73) Assignee: Tektronix, Inc., Beaverton, OR (US)

( * ) Notice: Subject to any disclaimer, the term of this patent is extended or adjusted under 35 U.S.C. 154(b) by 130 days.

(21) Appl. No.: 18/225,034

(22) Filed: Jul. 21, 2023

(65) Prior Publication Data

US 2024/0036079 A1   Feb. 1, 2024

Related U.S. Application Data

(60) Provisional application No. 63/392,471, filed on Jul. 26, 2022.

(51) Int. Cl.
*G01R 15/18* (2006.01)
*G01R 15/14* (2006.01)
*G01R 19/00* (2006.01)

(52) U.S. Cl.
CPC ......... *G01R 15/181* (2013.01); *G01R 15/146* (2013.01); *G01R 19/0092* (2013.01)

(58) Field of Classification Search
CPC ... G01R 15/81; G01R 15/146; G01R 19/0092
See application file for complete search history.

(56) References Cited

U.S. PATENT DOCUMENTS

| | | | |
|---|---|---|---|
| 5,847,910 A | * | 12/1998 | Efantis ..................... H02H 7/04 361/38 |
| 6,670,799 B1 | | 12/2003 | Bull et al. |
| 9,136,786 B2 | | 9/2015 | McLean et al. |
| 9,201,104 B2 | | 12/2015 | Jackson et al. |
| 9,322,850 B2 | | 4/2016 | Wood et al. |
| 9,411,003 B2 | * | 8/2016 | Danesh ................. H02H 1/0015 |
| 10,746,767 B2 | | 8/2020 | Worones et al. |
| 2009/0251020 A1 | * | 10/2009 | Gieras ................... H02K 21/046 318/818 |
| 2018/0174724 A1 | * | 6/2018 | Gao ....................... G01R 15/181 |
| 2019/0311835 A1 | * | 10/2019 | Miller ..................... H01F 27/24 |
| 2020/0096545 A1 | * | 3/2020 | Wang ..................... G01R 19/25 |
| 2023/0001514 A1 | | 1/2023 | Heralic et al. |
| 2023/0296648 A1 | * | 9/2023 | Hoffman ................ G01R 19/12 324/126 |

* cited by examiner

*Primary Examiner* — Dominic E Hawkins
(74) *Attorney, Agent, or Firm* — Miller Nash LLP; Andrew J. Harrington

(57) ABSTRACT

A current measurement device includes a shunt having sense leads, the shunt configured to be located in a current path for a current to be measured, and a Rogowski coil at least partially wrapped around the shunt, the current measuring device configured to combine signals from the shunt and the Rogowski coil. A current measurement device includes a shunt having sense leads configured to be located in a current path for a current to be measured, a Rogowski coil in series with the sense leads and at least partially wrapped around the shunt, a compensating pole connected to the Rogowski coil, and an isolation barrier connected to the compensating pole.

23 Claims, 5 Drawing Sheets

CURRENT MONITOR COMBINING A SHUNT RESISTOR WITH A ROGOWSKI COIL

CROSS-REFERENCE TO RELATED APPLICATION

This disclosure claims benefit of U.S. Provisional Application No. 63/392,471, titled "CURRENT MONITOR COMBINING A SHUNT RESISTOR WITH A ROGOWSKI COIL," filed on Jul. 26, 2022, the disclosure of which is incorporated herein by reference in its entirety.

TECHNICAL FIELD

This disclosure relates to test and measurement systems, and more particularly to devices and methods for measuring or monitoring electrical currents.

BACKGROUND

Large and rapidly changing currents, such as are common in switching power supplies and motor drives using Wide Band Gap semiconductors (and in lightning or other arc discharges), are notoriously difficult to measure accurately.

One approach often used is to place a series resistor (or "shunt") in the current path, measure the voltage drop caused by the current, and divide by the resistance. This approach handles DC and lower frequencies well, but suffers at higher frequencies due to the inductive drop across the shunt, which exceeds the resistive drop for frequencies above a frequency $f_c$:

$$V = R \cdot i + L \cdot \frac{di}{dt} \quad f_c = \frac{R}{2\pi \cdot L}$$

When measuring large currents, a relatively small shunt resistance R is needed to keep the voltage drop and power dissipation of the shunt within reason, which leads to objectionably low usable bandwidth $f_c$.

The inductive drop can be eliminated by using a coaxial shunt, in which the resistive element is a cylinder, the return current passes through a larger and concentric outer cylinder, and the voltage measurement leads are routed out from the shunt inside the resistive cylinder. The symmetrical nature and the outer return current path ensure the magnetic field generated by the current circles between the shunt and the outer return path, leaving no magnetic field to impart an inductive drop on the measured voltage inside the shunt. Coaxial shunts eliminate measurement inductance (inductance included in the measured voltage drop), but require a longer current path through the shunt, thus increasing the insertion inductance (inductance inserted in the current path of the system under test). Even with no measurement inductance, coaxial shunts have limited bandwidth due to the skin effect of the shunt material. As frequency increases, the skin depth of electric current in a conductor decreases. Once the skin depth approaches the thickness of the resistive cylinder, a significantly lower portion of the current flows on the inside of the shunt, generating less resistive drop on the inside where the voltage is measured.

Another method to improve the usable bandwidth of a shunt is to add a canceling mutual inductance $M_c$ in the lead dress of the voltage measurement leads of a conventional shunt:

$$V = R \cdot i + L \cdot \frac{di}{dt} - M_C \cdot \frac{di}{dt}$$

This minimizes the insertion inductance by not requiring a particular return current path but is trickier to implement because the return current path must still be known to determine lead placement to achieve cancelation ($M_C$=L). The cancellation approach also suffers at high frequency due to skin effect: the current path through the shunt will shift in physical location as the skin depth approaches the shunt thickness, changing $M_C$, L, & R.

Another current measurement approach is to sense the magnetic field along a closed loop encircling the current to be measured. A Rogowski coil senses the time derivative of this magnetic field; the voltage induced on the Rogowski coil can then be integrated to determine the current flow. Rogowski coils have the advantage of inherent isolation and relative ease of installation but cannot measure DC current. In fact, there is a trade-off between the low-frequency usable range and the high-frequency bandwidth of a Rogowski coil. Achieving low frequency coverage suggests a large mutual inductance between the coil and the current flow to maximize the coil voltage at low di/dt, whereas high bandwidth suggests a small self-inductance of the coil to minimize its time constant driving the load impedance of the integrator.

DETAILED DESCRIPTION

Embodiments of the disclosure generally include measuring current using a device that includes a combined shunt and Rogowski coil. The output of the combined shunt and Rogowski coil may feed through a compensating pole, such as a passive RC or LR filter. Some embodiments may connect the output(s) of the current measurement device to an isolated probe. The embodiments involve inserting a shunt having sense leads into the current path to be measured. The current measurement device includes a Rogowski coil wrapped at least partially around the shunt. The current measurement device is configured to combine the output signals from the shunt and the Rogowski coil. In some embodiments, the Rogowski coil is placed in series with the shunt sense leads.

This configuration generates a voltage:

$$V = R \cdot i + L \cdot \frac{di}{dt} - M_C \cdot \frac{di}{dt} + M_R \cdot \frac{di}{dt}$$

where $M_R$ is the mutual inductance of the Rogowski coil to the current in the shunt. The coil is attached to the shunt sense leads as much as practical opposite the current return path. This avoids the strongest magnetic field and thereby creates a canceling mutual inductance $M_C$ roughly equal to L. Unlike $M_C$ and L, $M_R$ of a uniform Rogowski coil surrounding a conductor does not change with skin-depth-induced shifts in the current path.

By making $M_c \approx L$ and $M_R \gg L - M_c$ one can closely approximate the voltage as:

$$V = R \cdot i + M_R \cdot \frac{di}{dt}$$

This represents a single-zero frequency response, and can be flattened with a single-pole compensator, such as an RC filter with the same time constant, meaning $R_f C_f = M_R/R$. At low frequencies, the $R \cdot i$ term dominates the shunt voltage, the compensating pole/RC filter is flat, and the shunt operates as a standard shunt. At high frequencies, the $M_R \cdot di/dt$ term dominates the shunt voltage, the compensating pole acts as the integrator for the Rogowski coil, and the final output voltage remains flat. The output voltage of the compensating pole may be measured by an isolated probe to maintain the isolation benefit of a Rogowski coil. The compensating pole may take many forms, including various architectures of RC (Resistor Capacitor) filters, or LR (Inductor Resistor) filters.

Since DC and low frequencies are handled by the shunt action, the Rogowski coil inductance may be optimized for high-frequency operation. This allows for a design with smaller coil inductance and higher frequency coverage than a stand-alone Rogowski coil.

Figure 1:
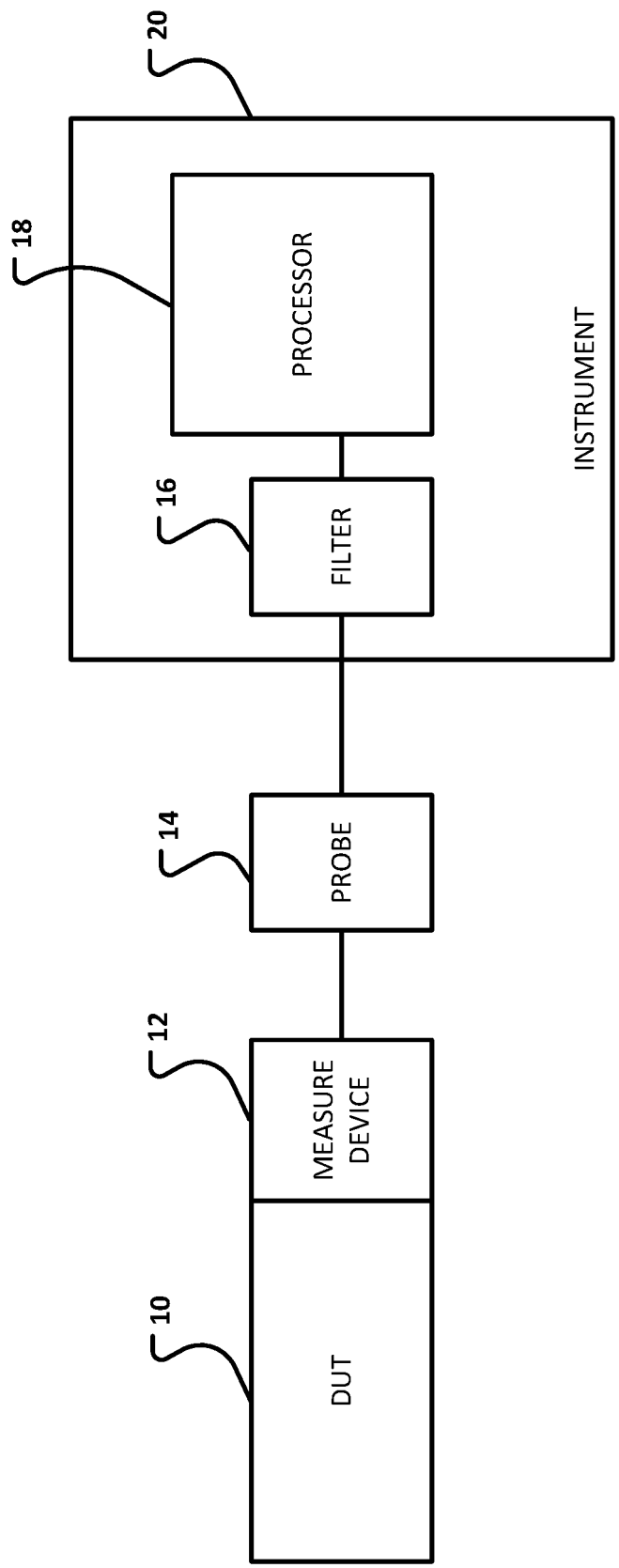
FIG. 1 shows a block diagram of a current measurement accessory within a test and measurement system.

FIG. 1 shows a block diagram of a test and measurement system that includes a current measurement device in the form of a current shunt. One should note that this diagram shows several components not needed for the current measurement device but provides context for various embodiments of the device. In FIG. 1, a device under test (DUT) 10 has a current measurement device 12 attached to it. The current measurement device may comprise a built-in or "solder-down" component, or an attachable/detachable component. The DUT will generally connect to the test and measurement instrument 20 through one or more probes 14. In some instances, the one or more probes may comprise "isolated probes" in which the probe is galvanically isolated from the instrument. For higher voltage and frequency operations, including those with wide-band gap (WBG) devices, isolated probes allow for more accurate measurements and reduce shock hazard.

As will be discussed in more detail later, one or more filters at the instrument level may receive the output of the measurement device 12. These differ from the compensating pole filter discussed above. Filter 16 may take the form of a separate component, such as a digital signal processor, or analog filter, or may result from the processor 18 executing instructions to apply filtering to the incoming signal.

Figure 2B:
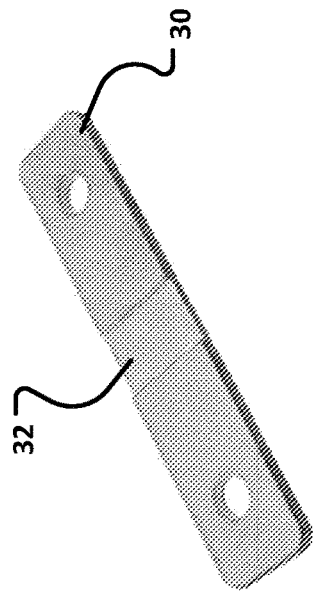
FIGS. 2A-2D show different embodiments of current shunts.
Figure 2D:
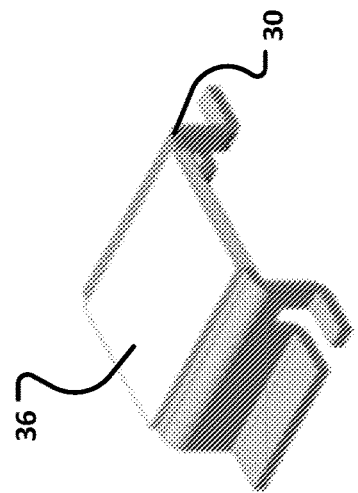
Figure 2A:
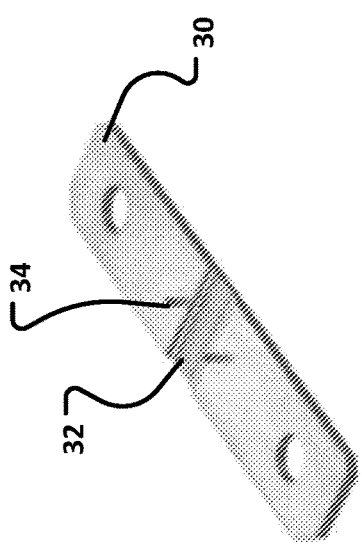
Figure 2C:
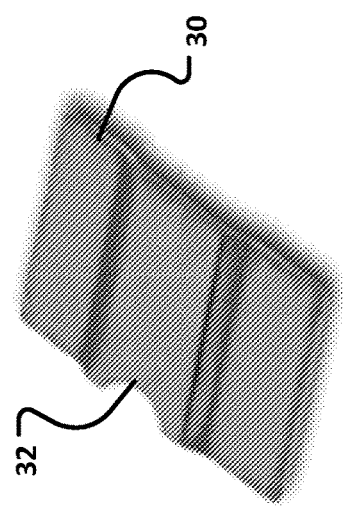

A Rogowski coil may be implemented in a flex circuit board of two (or more) layers, which can then be wrapped around and soldered onto a busbar or surface-mount metal-alloy shunt 30 such as shown in FIGS. 2A-2D. The coil may wrap around the resistive portion 32 or 36 of the shunt 30, which may typically be made of manganin. In the embodiment of FIG. 2A, the sense leads such as 34 protrude from the shunt bar. FIGS. 2B-2D show different embodiments of the resistive portion 32 or 36 in the middle of copper portions.

Figure 3:
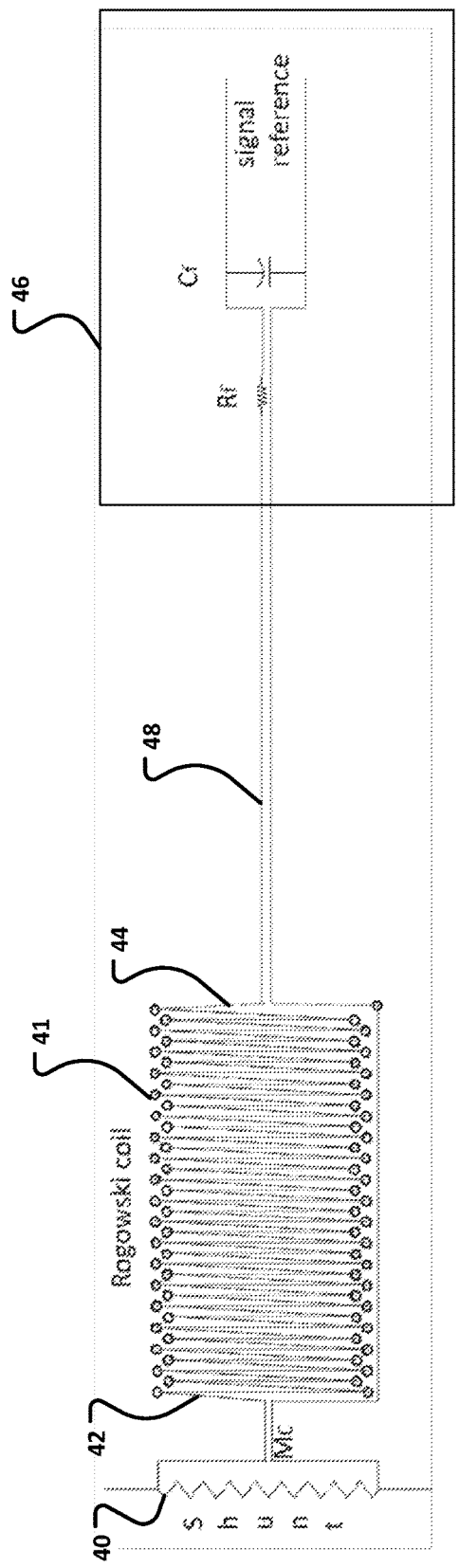
FIG. 3 shows an embodiment of a current shunt combined with a Rogowski coil.
Figure 4:
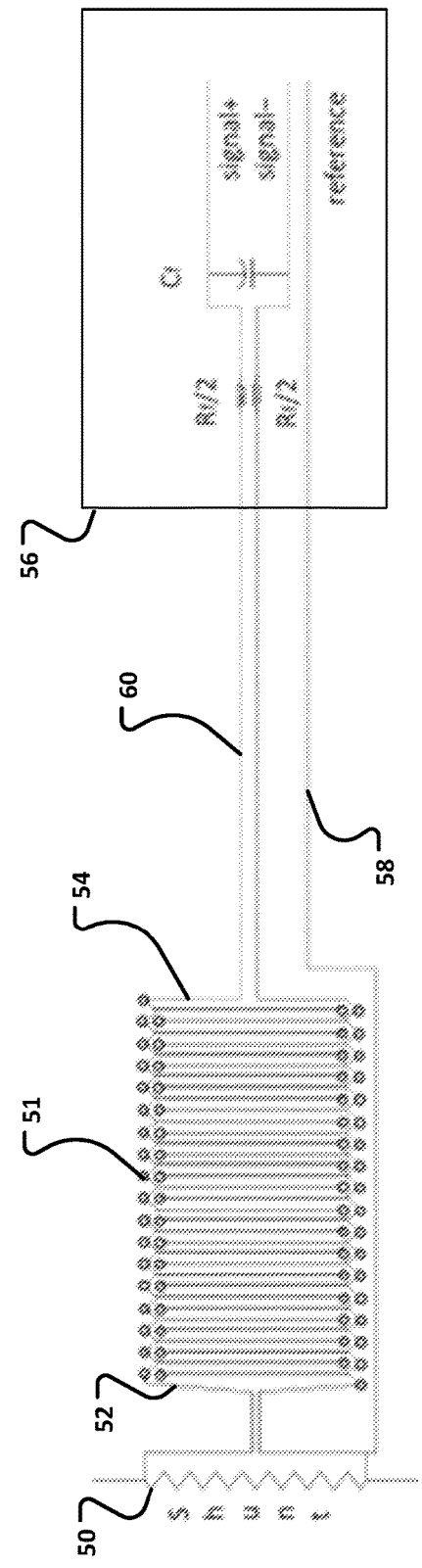
FIG. 4 shows an alternative embodiment of a current shunt combined with a Rogowski coil.

FIGS. 3 and 4 show a current measurement device that includes a combined shunt having sense leads and a Rogowski coil, in different embodiments. In a single-ended implementation shown in FIG. 3, the reference, which may comprise the shield of the isolated probe or isolation barrier, may tie to one side of the shunt 40. The Rogowski coil 41 may tie to the other side of the shunt, one end of $R_f$ to the coil, the other end of $R_f$ to $C_f$ and the input of the probe, and the other end of $C_f$ to the probe reference.

One set of traces, designated by 42, are formed on one layer of the flex circuit nearest the shunt. The other set of traces, designated by 44, are formed on the opposite side of the layer of the flex circuit further from the shunt. In some embodiments, the flex circuit may have an insulating layer or flexible dielectric core between the layer having traces 42 and the layer having traces 44, and in some embodiments may also have insulating layers as the topmost and bottommost layers of the flex circuit. The traces 42 are connected to the traces 44 by vias in the flex circuit so that the traces and the vias form a continuous conductive Rogowski coil structure in the flex circuit. This causes the magnetic field looping the shunt to flow between the two sets of traces when the coil is wrapped around the shunt. The section of traces labeled Mc are placed as near to the shunt as possible and opposite the return current path to form the cancelling mutual inductance. The Rogowski coil section is then wrapped, at least partially, around the shunt. In one embodiment, a transmission line such as 48 connects to the coil. In another embodiment, the transmission line may connect to an isolation barrier, and in yet another embodiment, the isolation barrier exists in a probe head. The coil output may also connect to a fixed-time-constant single pole compensator 46. FIG. 3 shows an embodiment of this comprises an RC filter, having a filter resistor $R_f$ and a filter capacitor $C_f$.

FIG. 4 shows a differential signaling embodiment. In a differential implementation, a shield portion of the isolation barrier, such as the shield of the isolated probe may tie to either side of the shunt. Half of the Rogowski coil 51 may be placed on each side of the shunt in order to feed a differential signal through the compensation pole 56. This may feed into $R_f/2$ on each side to $C_f$ from side to side of the differential probe input. Alternatively, $C_f$ may be replaced with two capacitors $2 \cdot C_f$ from each signal line to the reference. In another embodiment, the differential transmission line may be periodically "twisted" to cancel the pick-up of stray electro-magnetic fields.

Figure 5:
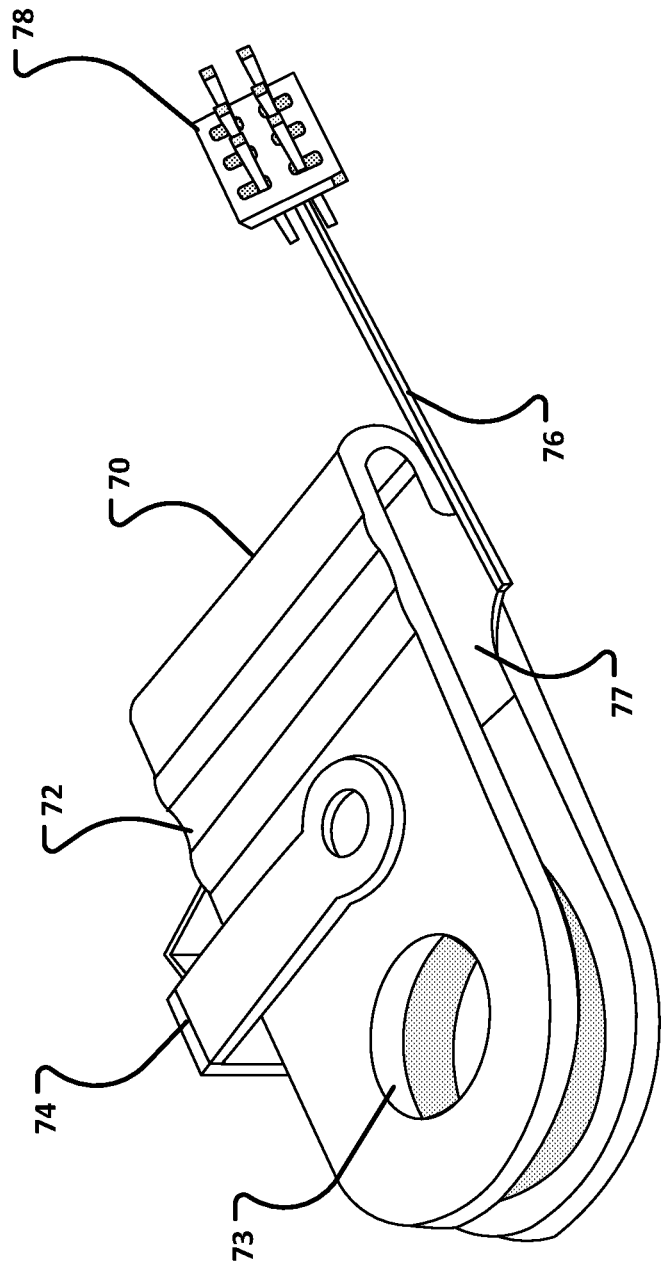
FIG. 5 shows an embodiment of a current shunt combined with a Rogowski coil for installation in a busbar.

FIG. 5 shows an embodiment of the shunt having the Rogowski coil in a busbar embodiment in which the Rogowski coil is sandwiched within a folded busbar shunt. The busbar shunt 70 has a resistive portion 72. The shunt folds in half to lower insertion inductance and put the two screw terminals such as 73 on the same axis, with a flex circuit 77 between the folded halves. One sense lead 74 wraps around the top to connect to one side of the shunt and the other sense lead wraps around underneath, hidden in this view, to connect to the other side of the shunt. A square-pin connector 78 at the end of a portion of the flex 76 connects this to the isolation barrier or probe head. The traces on the flex for the coil, and the compensating pole components are not shown.

Figure 6:
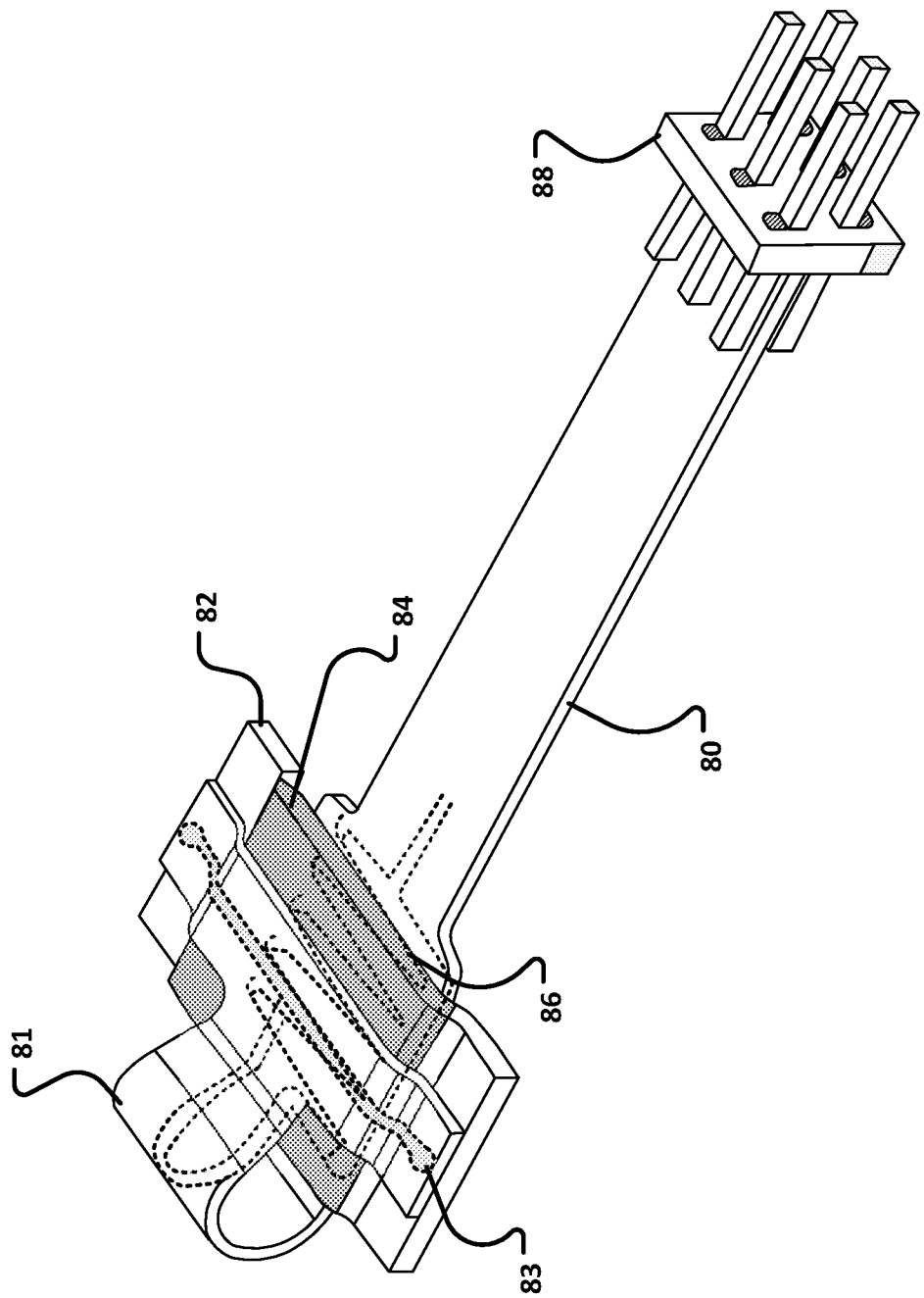
FIG. 6 shows an embodiment of a current shunt combined with a Rogowski coil for surface-mounting on a printed circuit board.

FIG. 6 shows an embodiment of a surface-mount shunt with a flex circuit 80 underneath, between the shunt and the return path in the circuit board on which the shunt will be mounted. The shunt comprises the metal portion 82 and the resistive portion 84. Each sense lead such as 83 wraps around the top of the shunt, by way of portion 81 of flex circuit 80, and connects on either side of the shunt to each metal portion such as 82. In this picture, the flex circuit traces forming the Rogowski coil are shown at 86. Although not shown, those traces would continue up the flex circuit 80 to the compensating pole components and the square-pin connector 88.

Many modifications and variations exist. For example, the filter resistor $R_f$ may serve as termination for a transmission-line between the shunt/coil and the filter, allowing the probe head to be placed some distance from the shunt while still maintaining high bandwidth. This allows the shunt to be placed in very close proximity to the load without providing extra room for the probe head, thus minimizing insertion inductance.

Since the Rogowski coil connects directly to the shunt around which it wraps, it does not need high-voltage insulation, and may be placed in very close proximity to the shunt. This may further reduce coil inductance by keeping the coil as short as possible.

If the return-current path is well-defined, such as for the surface-mount shunt over a return plane layer within a PCB, the Rogowski-coil self-inductance can be further minimized by shortening the coil to cover the space between the shunt and the return path only, rather than fully encircling the shunt. The magnetic field is strongest within the current loop, so this placement will achieve almost as much mutual inductance as a complete encirclement, but with considerably less self-inductance. This arrangement also avoids vias, used to implement the coils in a flex circuit, in the tight bend sections around the sides of the shunt, reducing the chance of via cracking.

The compensating filter time constant may be matched to the $M_R/R$ time constant with any combination of methods. For instance, in one embodiment, the shunt and the Rogowski coil may be built together as a single unit with appropriate component values. This may take the form shown in FIG. 5 or 6, as examples.

Another embodiment provides a selection of fixed-time-constant filters appropriate for given shunt-Rogowski-coil pairs. This may be implemented in the filter blocks 46 and 56 of FIGS. 3 and 4, respectively. In yet another embodiment, the filter block may provide one or more programmable filters, such as using FETs to switch capacitors in a capacitor DAC for $C_f$. The response pole due to the load of the filter resistance $R_f$ on the Rogowski coil's self-inductance may be compensated with a corresponding zero by placing some resistance in series with $C_f$. In yet another embodiment, the Rogowski loop area and/or pitch may be tapered along the length of the coil, such that the mutual inductance $M_R$ may be adjusted by sliding the appropriate section of the tapered coil underneath the shunt.

Regarding the system shown in FIG. 1, one can also work with the acquired signal from the probe as it enters the instrument to adjust for differences between the time constant of the compensating pole and $M_R/R$. For example, filter 16, which is applied after the signal is acquired by the probe, may take form of a DSP pole-zero filter applied to the acquired waveform to cancel any remaining filter time constant mismatch. In addition, if the $M_R \cdot di/dt$ term does not sufficiently dominate the $R \cdot I$ term at the frequency where skin effect begins significantly changing the effective resistance R, the filter 16 may comprise an analog and/or DSP filter applied to compensate the resultant error in the crossover region between shunt- and Rogowski-dominated response.

In this manner, a current measuring device comprises both a shunt and a Rogowski coil. In the embodiments here, the Rogowski coil is not in parallel or series with the current path of the shunt, but wraps around the shunt to minimize the distance, and therefore the inductive drop, caused by the shunt and coil.

Aspects of the disclosure may operate on particularly created hardware, on firmware, digital signal processors, or on a specially programmed general-purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

EXAMPLES

Illustrative examples of the disclosed technologies are provided below. An embodiment of the technologies may include one or more, and any combination of, the examples described below.

Example 1 is a current measurement device, comprising: a shunt having sense leads, the shunt configured to be located in a current path for a current to be measured; and a Rogowski coil at least partially wrapped around the shunt, the current measuring device configured to combine signals from the shunt and the Rogowski coil.

Example 2 is the current measurement device any of Examples 1 through X, wherein current measuring device is configured to combine the signals by placing the Rogowski coil in series with the sense leads.

Example 3 is the current measurement device of either of Examples 1 or 2, wherein the current measuring device is configured to combine the signals from the shunt and the Rogowski coil by adding the signals.

Example 4 is the current measurement device of Example 3, further comprising a compensating pole electrically connected to the Rogowski coil.

Example 5 is the current measurement device of Example 4, further comprising a filter applied to an output of the compensating pole, the filter configured to compensate for errors in a cross-over region between a shunt-dominated response and a Rogowski-coil-dominated response when a skin effect begins to change an effective resistance.

Example 6 is the current measurement device of Example 5, wherein the filter comprises an analog filter.

Example 7 is the current measurement device of Example 5, wherein the filter comprises a digital signal processing filter.

Example 8 is the current measurement device of Example 4, wherein a digital signal processing filter is configured to correct for a mismatch between time constants of the Rogowski coil and the compensating pole.

Example 9 is the current measurement device of Example 4, wherein the compensating pole comprises an LR filter.

Example 10 is the current measurement device of Example 4, wherein the compensating pole comprises an RC filter having at least one filter resistor and at least one filter capacitor.

Example 11 is the current measurement device of Example 10, wherein the at least one filter capacitor comprises two filter capacitors and the at least one filter resistor comprises two filter resistors, each filter capacitor connected between one of the two filter resistors and a reference.

Example 12 is the current measurement device any of Example 10, further comprising a resistance in series with the at least one filter capacitor.

Example 13 is the current measurement device any of Examples 1 through 12, wherein the current measurement device is configured to produce a single-ended output signal.

Example 14 is the current measurement device any of Examples 1 through 13, wherein the current measurement device is configured to produce a differential output signal.

Example 15 is the current measurement device any of Examples 1 through 14, wherein the Rogowski coil at least partially covers a space between the shunt and a current return path.

Example 16 is the current measurement device any of Examples 1 through 15, further comprising one or more programmable filters connected to the Rogowski coil.

Example 17 is the current measurement device of Example 16, wherein the one or more programmable filters comprise a switchable capacitor digital-to-analog converter (DAC).

Example 18 is the current measurement device any of Examples 1 through 17, wherein the shunt comprises a busbar shunt folded in half, and the Rogowski coil is positioned between the halves, with one sense lead wrapped around a top of the shunt to connect to one side of the shunt and another sense lead wrapped around a bottom of the shunt to connect to another side of the shunt.

Example 19 is the current measurement device any of Examples 1 through 18, wherein the shunt comprises a surface mount shunt and the Rogowski coil is positioned underneath the shunt with the sense leads wrapped around to a top of the shunt and connected on either end of the shunt.

Example 20 is the current measurement device of Example 15, wherein the Rogowski coil is tapered and slidable between the shunt and return current path to tune mutual inductance of the Rogowski coil and the shunt.

Example 21 is the current measurement device any of Examples 1 through 20, wherein the shunt and the Rogowski coil comprise a single unit.

Example 22 is a current measurement device, comprising: a shunt having sense leads configured to be located in a current path for a current to be measured; a Rogowski coil in series with the sense leads and at least partially wrapped around the shunt; a compensating pole connected to the Rogowski coil; and an isolation barrier connected to the compensating pole.

Example 23 is the current measurement device of Example 22, wherein a time constant of the compensating pole comprises an RC filter matched to a mutual inductance of the Rogowski coil to current in the shunt divided by an effective resistance.

Example 24 is the current measurement device of either of Examples 22 or 23, wherein the compensating pole comprises a selection of fixed time-constant RC filters selectable based upon a particular combination of the shunt and the Rogowski coil.

Example 25 is the current measurement device of any of Examples 22 through 24, wherein the isolation barrier is part of an isolated probe connected to a test and measurement device.

The previously described versions of the disclosed subject matter have many advantages that were either described or would be apparent to a person of ordinary skill. Even so, these advantages or features are not required in all versions of the disclosed apparatus, systems, or methods.

Although specific aspects of this disclosure have been illustrated and described for purposes of illustration, it will be understood that various modifications may be made without departing from the spirit and scope of the invention. Accordingly, the invention should not be limited except as by the appended claims.

What is claimed is:

1. A current measurement device, comprising:
   a shunt having sense leads, the shunt configured to be located in a current path for a current to be measured; and
   a Rogowski coil at least partially wrapped around the shunt;
   a compensating pole electrically connected to the Rogowski coil; and
   a filter applied to an output of the compensating pole, the filter configured to compensate for errors in a crossover region between a shunt-dominated response and a Rogowski-coil-dominated response when a skin effect begins to change an effective resistance,
   the current measuring device configured to combine signals from the shunt and the Rogowski coil.

2. The current measurement device as claimed in claim 1, wherein the current measuring device is configured to combine the signals from the shunt and the Rogowski coil by placing the Rogowski coil in series with the sense leads.

3. The current measurement device as claimed in claim 1, wherein the current measuring device is configured to combine the signals from the shunt and the Rogowski coil by adding the signals.

4. The current measurement device as claimed in claim 1, wherein the filter comprises an analog filter.

5. The current measurement device as claimed in claim 1, wherein the filter comprises a digital signal processing filter.

6. The current measurement device as claimed in claim 1, wherein a digital signal processing filter is configured to correct for a mismatch between time constants of the Rogowski coil and the compensating pole.

7. The current measurement device as claimed in claim 1, wherein the compensating pole comprises an LR filter.

8. The current measurement device as claimed in claim 1, wherein the compensating pole comprises an RC filter having at least one filter resistor and at least one filter capacitor.

9. The current measurement device as claimed in claim 8, wherein the at least one filter capacitor comprises two filter capacitors and the at least one filter resistor comprises two filter resistors, each filter capacitor connected between one of the two filter resistors and a reference signal.

10. The current measurement device as claimed in claim 8, further comprising a resistance in series with the at least one filter capacitor.

11. The current measurement device as claimed in claim 1, wherein the current measurement device is configured to produce a single-ended output signal.

12. The current measurement device as claimed in claim 1, wherein the current measurement device is configured to produce a differential output signal.

13. The current measurement device as claimed in claim 1, wherein the Rogowski coil at least partially covers a space between the shunt and a current return path.

14. The current measurement device as claimed in claim 13, wherein the Rogowski coil is tapered and slidable between the shunt and return current path to tune mutual inductance of the Rogowski coil and the shunt.

15. The current measurement device as claimed in claim 1, further comprising one or more programmable filters connected to the Rogowski coil.

16. The current measurement device as claimed in claim 15, wherein the one or more programmable filters comprise a switchable capacitor digital-to-analog converter (DAC).

17. The current measurement device as claimed in claim 1, wherein the shunt comprises a busbar shunt folded in half, and the Rogowski coil is positioned between the halves, with one sense lead wrapped around a top of the shunt to connect to one side of the shunt and another sense lead wrapped around a bottom of the shunt to connect to another side of the shunt.

18. The current measurement device as claimed in claim 1, wherein the shunt comprises a surface mount shunt and the Rogowski coil is positioned underneath the shunt with the sense leads wrapped around to a top of the shunt and connected on either end of the shunt.

19. The current measurement device as claimed in claim 1, wherein the shunt and the Rogowski coil comprise a single unit.

20. A current measurement device, comprising:
    a shunt having sense leads configured to be located in a current path for a current to be measured;
    a Rogowski coil in series with the sense leads and at least partially wrapped around the shunt;
    a compensating pole connected to the Rogowski coil; and
    an isolation barrier connected to the compensating pole.

21. The current measurement device as claimed in claim 20, wherein a time constant of the compensating pole comprises an RC filter matched to a mutual inductance of the Rogowski coil to current in the shunt divided by an effective resistance.

22. The current measurement device as claimed in claim 20, wherein the compensating pole comprises a selection of fixed time-constant RC filters selectable based upon a particular combination of the shunt and the Rogowski coil.

23. The current measurement device as claimed in claim 20, wherein the isolation barrier is part of an isolated probe connected to a test and measurement device.

* * * * *